Aug. 29, 1967 — J. F. WAHL — 3,338,600
BUSHING FOR A PRESSED FIT CONNECTION
Filed July 29, 1966

INVENTOR
John F. Wahl
by Zabel, Baker, York,
Jones & Dithmar
Att'ys

United States Patent Office 3,338,600
Patented Aug. 29, 1967

3,338,600
BUSHING FOR A PRESSED FIT CONNECTION
John F. Wahl, Sterling, Ill., assignor to Wahl Clipper Corporation, Sterling, Ill., a corporation of Illinois
Filed July 29, 1966, Ser. No. 568,865
2 Claims. (Cl. 285—158)

This invention relates to a bushing for a pressed fit connection, and more particularly to such a bushing adapted to be used with a pair of telescoping tubular members.

One object of the invention is to provide a bushing of slightly yieldable plastic material which cooperates with a pair of telescoping tubular members to establish a pressed fit connection possessing extreme rigidity.

Another object is to provide a bushing establishing a pressed fit connection between a pair of telescoping tubular members wherein there is positive positioning of the tubular members relative to each other.

Another object is to provide a bushing of the aforesaid character capable of compensating for minor dimensional irregularities in the two tubular members and in the bushing itself.

Still another object is to provide a bushing of the character described which is easy to assemble with associated telescoping tubular members in forming the contemplated pressed fit connection.

Yet another object is to provide a bushing for establishing a pressed fit connection between a pair of telescoping tubular members, the bushing having means in addition to frictional relationship for supporting the weight of the male tubular member.

Other objects, advantages and details of the invention will become apparent as the description proceeds, reference being had to the accompanying drawing wherein one form of the invention is shown. It is to be understood that the description and drawing are illustrative only, and that the scope of the invention is to be measured by the appended claims.

Figure 1:
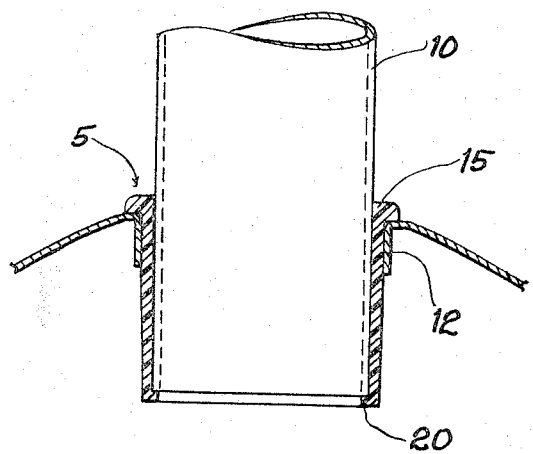
FIG. 1 is a side elevational view, partly in section, of a pair of tubular members and the bushing of the invention assembled in a rigid pressed fit connection.

Before describing the bushing of the invention and the pressed fit connection in which the bushing is used, reference is made to my pending U.S. design application Ser. No. 85,091, filed May 4, 1965, now U.S. Design Patent No. D. 205,452. The bushing and pressed fit connection of the present invention has been designed for and works highly satisfactorily with the article shown in said design patent in providing a rigid connection between the upstanding pedestal and the lid of the base assembly shown in broken line.

As will be understood from considering said patent, the pedestal and the components carried thereby are comparatively heavy, thereby imposing a requirement that the connection between the pedestal and base be a rigid one and capable of supporting substantial weight. Further, the article shown in the patent is subject to mass production, and it thus is desirable that the pressed fit connection between pedestal and base be established quickly and economically. The present bushing cooperates to these ends and is highly satisfactory in practice.

Referring now to the drawing, the bushing of the invention is generally designated 5. Bushing 5 is tubular in shape and formed of slightly yieldable plastic material, such for example as thermoplastic material presently sold by General Electric Company under the trademark "Lexan." The named material has been found particularly satisfactory in that it does not deteriorate with extended time under moderate stress and in the presence of rapidly moving warm air such as encountered in the indicated environment.

The members shown in the illustrated pressed fit connection are elongated cylindrical member or tube 10, the male member of the assembly, and comparatively short tubular member 12, the female member of the assembly. Member 12, as shown, is part of the base of the pedestal arrangement shown in the mentioned patent.

Elongated member 10 has an outer diameter D, while comparatively short tubular member 12 has an inner diameter B which is somewhat greater than the diameter D of member 10.

Bushing 5 is at least about twice as long as tubular member 12, and in the form of the invention shown is somewhat greater than twice the length of member 12. The precise length of bushing 5 is not critical, but it should be at least about twice as long as member 12 in order to impart requisite stability, especially when member 12 is comparatively short, as shown.

The end of bushing 5 which receives elongated member 10 when the connection is assembled has an exterior flange 15, the lower surface 16 (FIG. 2) of which engages end 17 of tubular member 12. The other end of bushing 5 has an interior flange 20 which is engaged by the inserted end of member 10, as best shown in FIG. 1.

Flanges 15 and 20 cooperate as stops to position member 10 and tubular member 12 relative to each other, and flange 20 also performs the function of partially supporting the weight of member 10, as will be understood.

Figure 2:
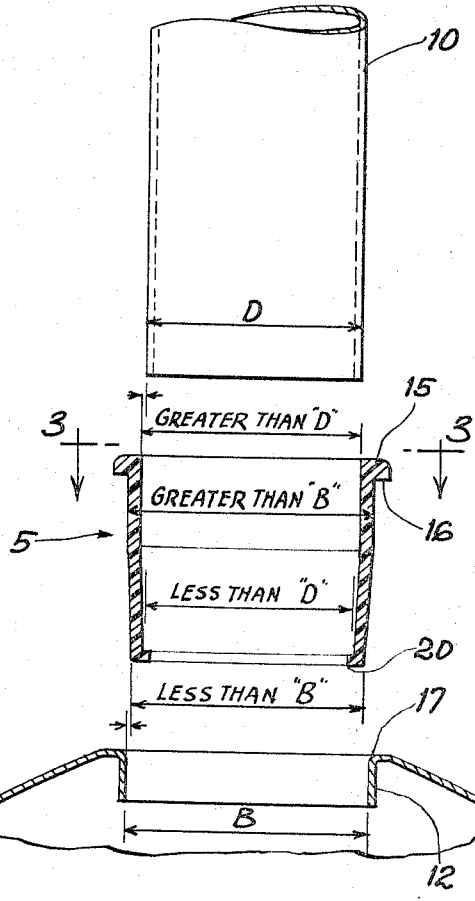
FIG. 2 is an exploded side elevational view, partly in section, of the tubular members and bushing shown in FIG. 1.
Figure 4:
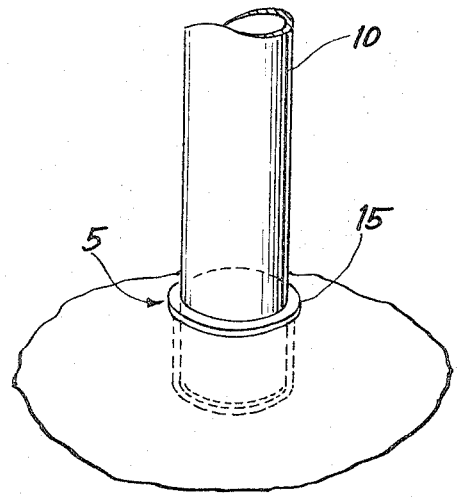
FIG. 4 is a reduced perspective view of a pair of telescoping tubular members and the bushing of the invention in assembled relation.
Figure 3:
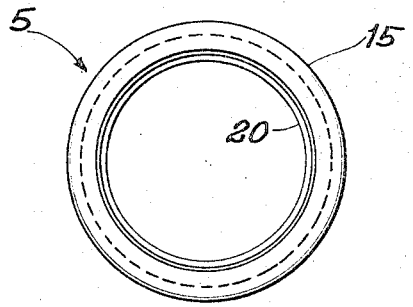
FIG. 3 is a top plan view of the bushing on line 3—3 of FIG. 2.

As indicated by the legends applied to FIG. 2 the inner diameter of bushing 5 at the end thereof having exterior flange 15 is slightly greater than the outer diameter D of member 10. This facilitates entrance of member 10 into the bushing as the pressed fit connection is made.

The outer diameter of bushing 5 at the end having exterior flange 15 is slightly greater than the inner diameter B of tubular member 12. This aids in establishing a tight and rigid fit.

The outer diameter of the end of bushing 5 having interior flange 20 is slightly less than the inner diameter B of tubular member 12. This facilitates entrance of bushing 5 into tubular member 12 during formation of the connection. Also, the inner diameter of bushing 5 at the end having an interior flange 20 is slightly less than the outer diameter D of member 10, whereby this end of the bushing is expanded by the inserted member 10, thus enhancing the tight fit and the rigidity of the connection.

In the form of the invention shown, both the outer and inner surfaces of the bushing wall adjacent the end having interior flange 20 taper slightly toward the bushing axis in the direction of that end. These tapers are exaggerated for clarity in FIG. 2.

The slightly yieldable plastic material of bushing 5 has sufficient flow characteristic that it establishes a rigid connection, and yet accommodates members 10 and 12 having reasonable tolerances as to outer diameters and inner diameters, respectively.

Completing the description of the invention, the various dimensions of a commercial bushing made of "Lexan" thermoplastic material and of the associated tube and tubular members now will be given. This exemplary bushing has a length of 1.500 inches, but, as mentioned, the length is not critical.

The outer diameter D of member 10 is 1.630 inches, and this dimension, as well as others, is susceptible to reasonable tolerance. The inner diameter B of tubular member 12 is 1.812 inches.

A bushing 5 designed to cooperate with a member 10 and tubular member 12 of the given dimensions has an inner diameter adjacent exterior flange 15 of 1.646 inches, and an inner diameter at the opposite end of 1.626 inches. The outer diameter of bushing 5 at the end adjacent exterior flange 15 is 1.822 inches, while the outer diameter at the opposite end is 1.782 inches.

A pressed fit connection employing the bushing of the invention is extremely rigid, and lasting in quality. However, the members may be separated if desired, and replaced without appreciable loss of quality.

Although male member 10 of the assembly has been illustrated as a tube, it equally well may be a solid, cylindrical member having the indicated outer diameter D, and the disclosure and claims are to be construed accordingly.

From the above description it is thought that the construction and advantages of the invention will be readily apparent to those skilled in the art. Various changes in detail may be made without departing from the spirit or losing the advantages of the invention.

Having thus described the invention, what I claim as new and desire to secure by Letters Patent is:

1. A bushing for a pressed fit connection between an elongated member having an outer diameter D and a comparatively short tubular member having an inner diameter B greater than D, said bushing having a tube of slightly yieldable plastic material at least about twice as long as said tubular member and having an exterior flange on the end receiving said elongated member, said exterior flange engaging an end of said tubular member, and an interior flange on the other end thereof, said interior flange serving as a positioning stop and support for the end of said elongated member, the inner diameter of said bushing at the end having the exterior flange being slightly greater than D to facilitate entrance of said elongated member, the outer diameter at said end being slightly greater than B to insure a tight fit, the outer diameter of said other end of said bushing slightly less than B to facilitate entrance of said bushing into said tubular member, and the inner diameter of said other end of said bushing slightly less than D whereby said other end is expanded by said elongated member, enhancing the tight fit.

2. The bushing of claim 1 wherein both the outer and inner surfaces of the bushing wall adjacent the end having the interior flange taper toward the bushing axis in the direction of said end.

References Cited
UNITED STATES PATENTS

| | | | |
|---|---|---|---|
| 2,269,695 | 1/1942 | Scharf | 285—53 |
| 2,271,657 | 2/1942 | Miller | 285—423 |
| 2,592,130 | 4/1952 | Erb | 285—47 |
| 3,033,624 | 5/1962 | Biesecker. | |
| 3,076,668 | 2/1963 | Famely | 285—159 |

CARL W. TOMLIN, *Primary Examiner.*

W. L. SHEDD, J. L. KOHNEN, *Assistant Examiners.*